(12) United States Patent
Yang et al.

(10) Patent No.: US 10,043,101 B2
(45) Date of Patent: Aug. 7, 2018

(54) LOCAL FEATURE REPRESENTATION FOR IMAGE RECOGNITION

(71) Applicant: Adobe Systems Incorporated, San Jose, CA (US)

(72) Inventors: Jianchao Yang, San Jose, CA (US); Jonathan Brandt, Santa Cruz, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 420 days.

(21) Appl. No.: 14/535,963

(22) Filed: Nov. 7, 2014

(65) Prior Publication Data

US 2016/0132750 A1  May 12, 2016

(51) Int. Cl.
*G06K 9/52* (2006.01)
*G06K 9/46* (2006.01)
*G06K 9/62* (2006.01)
*G06F 17/30* (2006.01)

(52) U.S. Cl.
CPC ......... *G06K 9/52* (2013.01); *G06F 17/30271* (2013.01); *G06K 9/46* (2013.01); *G06K 9/4642* (2013.01); *G06K 9/6201* (2013.01); *G06K 9/6226* (2013.01); *G06K 9/6267* (2013.01); *G06K 9/621* (2013.01); *G06K 2009/4666* (2013.01)

(58) Field of Classification Search
CPC ........ G06T 7/0083; G06K 9/48; G06K 9/481; G06K 9/6446; G06K 9/222
See application file for complete search history.

(56) References Cited

U.S. PATENT DOCUMENTS

| 8,358,691 B1* | 1/2013 | Wang ........................ G06T 7/20 375/240.02 |
| 2003/0053685 A1* | 3/2003 | Lestideau .......... G06K 9/00228 382/164 |

(Continued)

OTHER PUBLICATIONS

Liu et al. "A fast, comprehensive shot boundary determination system" AT&T Labs Research 2007 IEEE International Conference on Multimedia and Expo. Aug. 2007, pages.*

(Continued)

*Primary Examiner* — Mia M Thomas
(74) *Attorney, Agent, or Firm* — Finch & Maloney PLLC (57) ABSTRACT

Techniques are disclosed for image feature representation. The techniques exhibit discriminative power that can be used in any number of classification tasks, and are particularly effective with respect to fine-grained image classification tasks. In an embodiment, a given image to be classified is divided into image patches. A vector is generated for each image patch. Each image patch vector is compared to the Gaussian mixture components (each mixture component is also a vector) of a Gaussian Mixture Model (GMM). Each such comparison generates a similarity score for each image patch vector. For each Gaussian mixture component, the image patch vectors associated with a similarity score that is too low are eliminated. The selectively pooled vectors from all the Gaussian mixture components are then concatenated to form the final image feature vector, which can be provided to a classifier so the given input image can be properly categorized.

19 Claims, 5 Drawing Sheets

(56) References Cited

U.S. PATENT DOCUMENTS

| | | | |
|---|---|---|---|
| 2003/0147558 A1* | 8/2003 | Loui | G06K 9/00624 382/225 |
| 2005/0271279 A1* | 12/2005 | Fujimura | G06K 9/00355 382/203 |
| 2008/0002893 A1* | 1/2008 | Vincent | G06K 9/3258 382/229 |
| 2008/0219558 A1* | 9/2008 | Lu | G06K 9/00248 382/190 |
| 2009/0208118 A1* | 8/2009 | Csurka | G06K 9/00664 382/228 |
| 2009/0285482 A1* | 11/2009 | Epshtein | G06K 9/00463 382/176 |
| 2010/0046830 A1* | 2/2010 | Wang | G06T 7/12 382/164 |
| 2010/0138040 A1* | 6/2010 | Kwon | B25J 13/003 700/246 |
| 2010/0215257 A1* | 8/2010 | Dariush | G06K 9/00369 382/159 |
| 2012/0054658 A1* | 3/2012 | Chuat | G06F 17/30247 715/771 |
| 2012/0163706 A1* | 6/2012 | Zhang | G06K 9/00684 382/159 |
| 2014/0029839 A1* | 1/2014 | Mensink | G06K 9/6272 382/159 |
| 2017/0236287 A1* | 8/2017 | Shen | G06T 7/0081 382/206 |
| 2017/0351914 A1* | 12/2017 | Zavalishin | G06K 9/00456 |

OTHER PUBLICATIONS

Lazebnik, et al., "Beyond Bags of Features: Spatial Pyramid Matching for Recognizing Natural Scene Categories," Proceedings of the 2006 IEEE Computer Society Conference on Computer Vision and Pattern Recognition. (CVOR'06). 8 pages.

Zhou, et al., "Image Classification using Super-Vector Coding of Local Image Descriptors," Published in ECCV'10 Proceedings of the 11th European conference on Computer vision: Part V, (2010), 14 pages.

The EM Algorithm for Gaussian Mixtures—Probabilistic Learning: Theory and Algorithms, CS 274A. Retrieved from the Internet on Sep. 18, 2014. URL: http://www.ics.uci.edu/~smyth/courses/cs274/notes/EMnotes.pdf (publication date unknown; last known modification date: Feb. 26, 2014), 4 pages.

Gavves, et al., "Fine-Grained Categorization by Alignments," The IEEE International Conference on Computer Vision (ICCV), Dec. 2013, 8 pages.

Jégou, et al., "Aggregating local descriptors into a compact image representation," IEEE Conference on Computer Vision & Pattern Recognition. (2010). 8 pages.

Gaussian Mixture Models and the EM-Algorithm, Retrieved from the Internet on Sep. 18, 2014, URL: http://www.Isv.uni-saarland.de/pattern_sr_ws0506/psr_0506_Chap8.pdf, (publication date unknown), 25 pages.

Sánchez, et al., "Image Classification with the Fisher Vector: Theory and Practice," Informatics mathematics, Research Report n° 8209, May 2013. 42 pages.

* cited by examiner

LOCAL FEATURE REPRESENTATION FOR IMAGE RECOGNITION

FIELD OF THE DISCLOSURE

This disclosure relates to techniques for image recognition, and more particularly, to techniques for carrying out fine-grained image classification.

BACKGROUND

Image recognition or classification is the task of assigning a predefined category label to an input image, which is a fundamental building block for intelligent image content analysis. For instance, an image of a bird may be labeled and assigned to one or more of the following categories: ornithology, birds, and blue heron. Even though it has been studied for many years, image classification remains to be a major challenge. Perhaps one of the most significant developments in the last decade in image recognition is the application of local image features, including the introduction of the Bag-of-Visual-Words (BOV) model and its extensions. In general, the BOV model treats an image as a collection of unordered local descriptors extracted from small patches of a given image. These local descriptors, sometimes referred to as local image descriptors or local visual descriptors, are vectors that mathematically represent one or more features depicted in the corresponding image patch (e.g., beak or head plumage of a bird). In any case, the BOV model quantizes the extracted local descriptors into discrete "visual words" and then computes a compact histogram. The histogram is a vector containing the (weighted) count of each visual word in the given image, which can be used as a feature vector in the image classification task. However, the BOV model discards the spatial order of local descriptors, which limits its descriptive power. To overcome this problem, one particularly popular extension of the BOV model uses spatial pyramid matching for recognizing natural scene categories and to take into account the global image structure. Other vector representations of local image descriptors, such as aggregation of local image descriptors, super-vector coding of local image descriptors, and Fisher-vector coding of local image descriptors, extend the BOV model to provide richer and more discriminative image representations for image classification and retrieval tasks. Even though such variants and extensions of the BOV methodology perform well on general object categorization tasks, they tend to be suboptimal in distinguishing finer details.

DETAILED DESCRIPTION

Techniques are disclosed for image feature representation. The techniques exhibit discriminative power that can be used in any number of classification tasks, and are particularly effective with respect to fine-grained image classification tasks, such as recognizing faces, text fonts, and different animals (e.g., birds, dogs, etc) and flowers, to name a few example such tasks. In one example embodiment, a given image to be classified is divided into image patches. A vector is generated for each image patch. Each image patch vector is then compared to the Gaussian mixture components of a Gaussian Mixture Model. Each mixture component is also a vector. Each such comparison generates a similarity score for each image patch vector. For each Gaussian mixture component, the image patch vectors associated with a similarity score that is too low are eliminated. The remaining image patch vectors from all the Gaussian mixture components are then used to form the final image feature vector, which can be provided to a classifier so the given input image can be properly categorized.

General Overview

As previously explained, conventional BOV-based algorithms perform well on general object categorization tasks, but tend to be suboptimal in distinguishing finer details. Comparing with generic image categorization problems, fine-grained image recognition relies on identifying the subtle differences in appearance of specific object parts. Specific algorithms have been developed over the last several years to address some aspects of the fine-grained recognition problem. One such algorithm provides a codebook-free and annotation-free approach for fine-grained image categorization and uses a very high-dimensional histogram to represent the color and gradient pixel values to alleviate the quantization problem in fine-grained recognition, while another uses constructed kernel descriptors based on shape, texture and color information for unsupervised template learning. Other algorithms use Fisher vectors to learn global level and object part level representations. Still other fine-grained recognition algorithms focus on image alignment by segmenting or detecting object parts before classification. In one such algorithm, distinctive image details are localized by roughly aligning the objects using an ellipse fit to the shape. Another approach uses co-segmentation to increase recognition accuracy, while another uses a joint framework of detection and segmentation to localize discriminative parts. While such conventional algorithms have achieved varying degrees of success with respect to fine-grained image recognition, there remains room for improvement particularly with respect to selecting confident local descriptors.

Thus, and in accordance with an embodiment of the present invention, techniques are disclosed for image feature representation. The methodology, which is generally referred to herein as the selective pooling vector (SPV) method, effectively rejects local descriptors that do not sufficiently contribute to the function learning, which in turn results in better function learning and improved classification performance on fine-grained recognition tasks, relative to conventional methods. In accordance with an embodiment, a given image to be classified is divided into image patches. A vector or so-called local descriptor is generated for each image patch that mathematically represents a feature of that image patch. A Gaussian Mixture Model (GMM) is then used to represent or encode the local descriptors. In more detail, each image patch vector is compared to the Gaussian mixture components (each mixture component is also a vector). Each such comparison effectively generates a similarity score for each image patch vector. The Gaussian mixture components are from a GMM trained with a plurality of training vectors generated from a corresponding plurality of relevant training images. Note that the training vectors are only used to learn the GMM. Once each image patch vector is associated with a similarity score, selective pooling can be carried out. In more detail, for each Gaussian mixture component, the image patch vectors associated with a similarity score that is too low are eliminated. Thus, for each Gaussian mixture component, a few image patch vectors may remain (for k-nearest neighbor pooling or thresholding), or one image patch vector may remain (for max pooling), or possibly no image patch vectors may remain (in the case where none of the image patch vectors are sufficiently close to that Gaussian mixture component according to the established similarity threshold). The remaining or so-called selectively pooled vectors from all the Gaussian mixture components are then used to form the final image feature representation, which is also a vector. In one embodiment, the remaining vectors are represented as matrices, which can be combined through the process of concatenation to form the final image feature representation. Other scalar and vector combining methods (e.g., adding, averaging, or other statistically relevant process) can be used as well to generate the final image feature representation from the remaining image patch representations, and the present disclosure is not intended to be limited to any particular type of combining method. So long as the final image vector is statistically relevant and representative of the remaining selectively pooled vectors, any such method can be used. So, a final image feature vector is generated from the remaining image patch vectors associated with sufficient similarity scores. The final image feature vector can then be provided to a classifier so that it can be classified and the given input image can be properly categorized.

As will be appreciated, the GMM itself can be developed as typically done from a set of training images depicting the target feature(s) to be classified. For instance, for purposes of dog classification, the GMM can be trained or otherwise developed from a plurality of images having numerous types of dogs in various poses and postures. As will be appreciated in light of this disclosure, the methodology is derived from learning a Lipschitz smooth nonlinear classification function in the local descriptor space using a linear approximation in a higher dimensional embedded space. Generally grounded on the function learning theory, the resulting feature representation is very effective in fine-grained recognition tasks. As will be further appreciated in light of this disclosure, the selective pooling vector methodology provided herein is distinct from conventional approaches such as the Super vector and Fisher vector representations in a number of meaningful ways. For instance, these conventional representations are based on aggregation through an averaging of all local image descriptors. There is no selectivity based on similarity of image patch vectors to the Gaussian mixture components, where at least some image patch vectors are eliminated. Such conventional approaches typically work well for coarse-grained image categorization. However, for fine-grained recognition, where the task is to distinguish fine differences between subcategories, including local descriptors far away from the cluster centers, such conventional approaches can actually harm the classification function learning. To this end, the averaging of all local image descriptors conducted in Super vector and Fisher vector representations smears the fine image structures that are important for fine-grained recognition.

In contrast, the selective pooling methodology according to an example embodiment of the present invention is based on choosing only a relatively few representative local image features per mixture component (or only a single representative local image feature), thus avoiding the smear-inducing averaging associated with conventional approaches such as Super vector and Fisher vector representations and better preserving the fine visual patterns in the original images. Comparative studies show that the selective pooling vector techniques provided herein outperform the super and Fisher vector coding methods on several fine-grained recognition tasks. The studies were performed on two different fine-grained image classification tasks including face recognition and fine-grained object categorization, using various publically available data sets, and will be discussed in turn. Both tasks require distinguishing subtle differences in appearance of specific object parts.

While vectors and encoding matrices can be used to represent local descriptors and Gaussian mixture components, any other suitable mathematical representations can be used as well, and the present disclosure is not intended to be limited to only vector-based representations. Rather, any mathematical representation that facilitates identification, comparing, combining, and elimination of extracted image features for purposes of classification as provided herein can be used.

System Architecture

Figure 1:
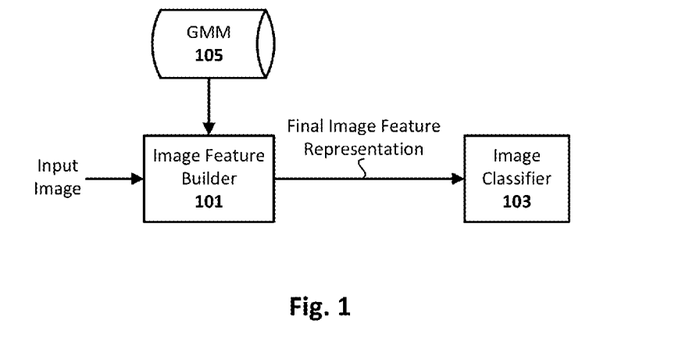
FIG. 1 illustrates an image classification system including an image feature builder configured in accordance with an embodiment of the present invention.

FIG. 1 illustrates an image classification system configured in accordance with an embodiment of the present invention. As can be seen, the system generally includes an image feature builder 101 and an image classifier 103. The image feature builder 101 is programmed other otherwise configured to receive an input image to be classified and to generate a final image feature representation or vector that can be embedded or otherwise associated with the input image. As can be further seen, the image feature builder 101 has access to a Gaussian Mixture Model (GMM) 105 that is used to encode the local descriptors densely extracted from that input image. The final image feature representation can be used by the classifier 103 to identify the category of the image.

As previously explained, the GMM 105 can be developed from a set of training images depicting target subject matter that includes the target feature(s) to be classified. For example, the target subject matter may be birds, or cats, or dogs, or flowers, or some other category of interest that can be depicted with imagery, and the target feature(s) to be classified may be, for example, bird beaks or plumage, or cat whiskers, or dog tails, or flower color. As will be appreciated in light of this disclosure, the image feature builder 101 executes a selective pooling vector method and operates to reject local descriptors that do not contribute to the function learning, which in turn results in better function learning and improved classification performance on fine-grained recognition tasks. Various embodiments of the selective pooling methodology that can be carried out by the image feature builder 101 will be discussed in more detail with reference to FIGS. 2-4. The image classifier 103 can be any suitable supervised or unsupervised image classifier (e.g., linear, non-linear, decision trees, look-up table, etc), and the present disclosure is not intended to be limited to any particular type of classifier. In one specific example embodiment, the image classifier 103 is implemented with a linear support vector machine (SVM) classifier.

Figure 2:
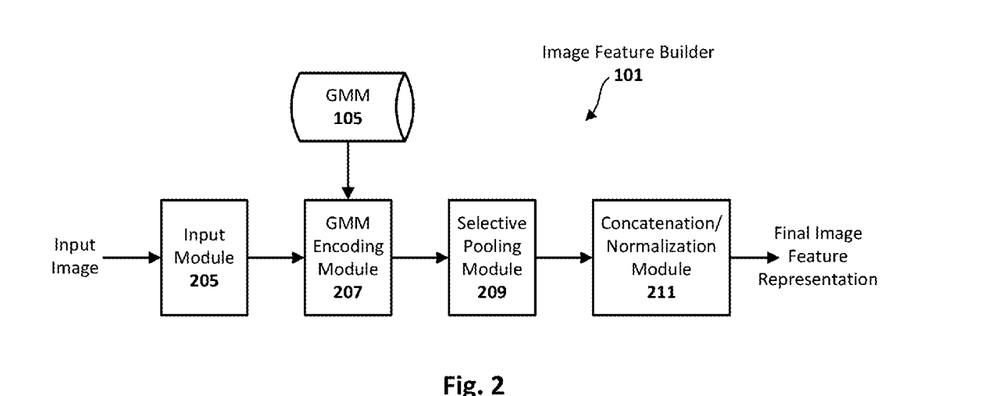
FIG. 2 illustrates an image feature builder configured in accordance with an embodiment of the present invention.

FIG. 2 illustrates an image feature builder 101 configured in accordance with an embodiment of the present invention. As can be seen, the image feature builder 101 is configured with a number of sub-modules or components, including an input module 205, a GMM encoding module 207, a selective pooling module 209, and a concatenation/normalization module 211. The GMM encoding module 207 is communicatively coupled with or otherwise has access to a GMM 105. Other embodiments may include a different degree of integration or modularity, and the example depicted is provided to facilitate discussion and not intended to limit the functionality provided herein to a particular architecture. For instance, in other embodiments, the input module 301 and the GMM 105 may be integrated with the GMM encoding module 207 to provide comparable functionality. Numerous other configurations will be apparent in light of this disclosure.

In operation, the input module 205 receives the given image and is programmed or otherwise configured to divide that image into image patches, and generate a vector or local descriptor for each image patch. The generation and resulting format of the vectors can be consistent with any given classification system, and may vary from one embodiment of the next. The GMM encoding module 207 is programmed or otherwise configured to compare each image patch vector to the Gaussian mixture components (each mixture component is also a vector) of the GMM 105. Each such comparison effectively generates a similarity score for each image patch vector. As will be appreciated, the Gaussian mixture components are from the GMM 105 that is trained with a plurality of training vectors generated from a corresponding plurality of relevant training images (e.g., birds, dogs, or any other images of target subject matter). Once each image patch vector is associated with a similarity score, selective pooling can be carried out. In more detail, for each Gaussian mixture component, the selective pooling module 209 is programmed or otherwise configured to eliminate the image patch vectors associated with a similarity score that is too low (relevant to a given threshold, as will be discuss in turn). Thus, for each Gaussian mixture component, a few image patch vectors may remain (for k-nearest neighbor pooling or thresholding), or one image patch vector may remain (for max pooling), or possibly none may remain (in the case where none of the image patch vectors are sufficiently close to that Gaussian mixture component). The concatenation/normalization module 211 receives the selectively pooled vectors from all the Gaussian mixture components and is programmed or otherwise configured to concatenate those selectively pooled vectors to form the final image feature representation, or vector. The concatenation/normalization module 211 of this example embodiment is further configured to normalize the feature representation properly in order to facilitate the classifier learning. In particular, local descriptor embedding may be modified by incorporating Gaussian covariance normalization and feature cardinality normalization, such that the covariance normalization corresponds to feature whitening within each Gaussian mixture to evenly spread the feature energy. The final image feature representation or vector can then be embedded with the input image or otherwise provided to the classifier 103 so that the input image can be properly categorized. Further details of how these functional modules operate and how they can be implemented in some example embodiments will be provided with reference to FIGS. 3*a-c* and 4.

Each of the various components can be implemented in software, such as a set of instructions (e.g., C, C++, object-oriented C, JavaScript, Java, BASIC, etc) encoded on any computer readable medium or computer program product (e.g., hard drive, server, disc, or other suitable non-transient memory or set of memories), that when executed by one or more processors, cause the various image feature builder methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the image feature builder functionality described herein. In a more general sense, any suitable combination of hardware, software, and firmware can be used.

In one example embodiment, each of the input module 205, GMM encoding module 207, selective pooling module 209, and concatenation/normalization module 211 is implemented with JavaScript or other downloadable code that can be provisioned in real-time to a client requesting access (via a browser) to an application server hosting an online image classification service. In one such embodiment, the GMM 105 may be accessible to a backend server configured to respond to client-based image classification requests. In another example embodiment, each of the input module 205, GMM encoding module 207, selective pooling module 209, and concatenation/normalization module 211 is installed locally on the user's computing system, so as to provide a stand-alone image feature builder or classification system that can access the GMM 105 (either locally or remotely). In still another embodiment, the various modules making up the image feature builder 101 can be partly implemented on the client-side and partly on the server-side. For example, each of the GMM encoding module 207, selective pooling module 209, and concatenation/normalization module 211 can be implemented on the server-side (such as a server that provides access to, for instance, a cloud-based image classification service or application), and the input module 205 can be at least partly implemented in a client-side user interface (such as a user interface for applications like InDesign, Lightroom, or Photoshop by Adobe Systems Incorporated, or any other suitable user interface) to allow for receiving the input image. In still other embodiments, the image feature builder 101 can be offered together with a given application (such as integrated with an image processing application or user interface, or with any application that allows for or can otherwise utilize image classification), or separately as a stand-alone module (e.g., plugin or downloadable app) that can be installed on a user's computing system to effectively operate as an image feature builder or classifier for a given application or a user-defined set of applications or for all image classifier tasks. Numerous such client-server and stand-alone arrangements will be apparent in light of this disclosure.

Methodology

Figure 3A:
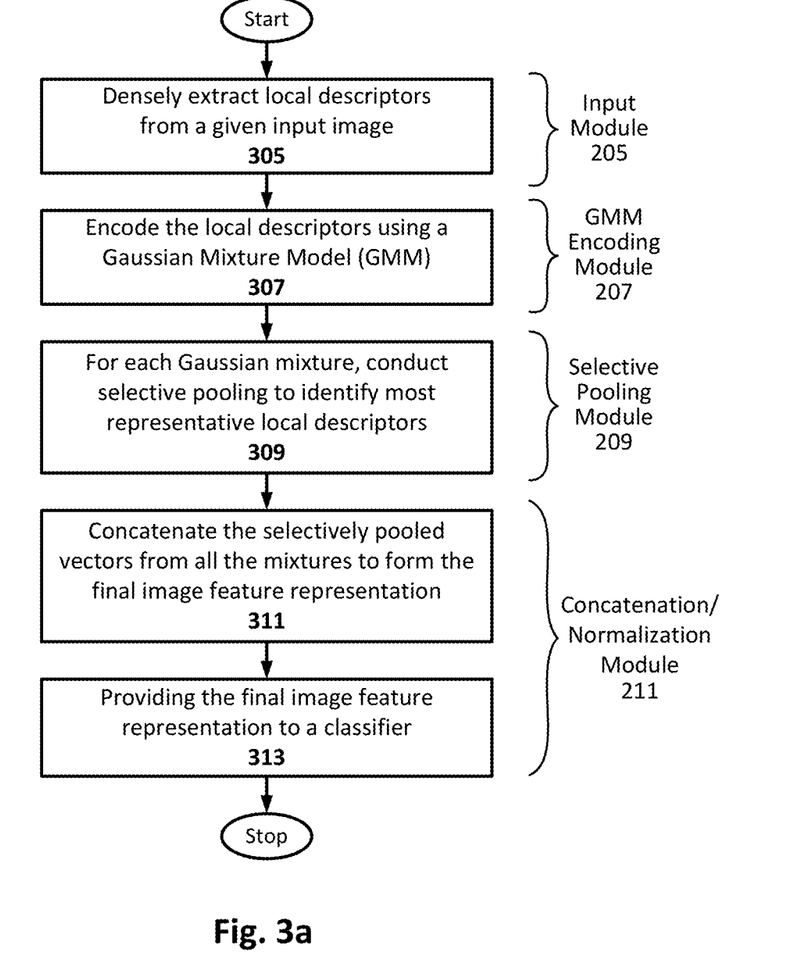
FIGS. 3a-b collectively illustrate a method for carrying out image classification in accordance with an embodiment of the present invention.
Figure 3B:
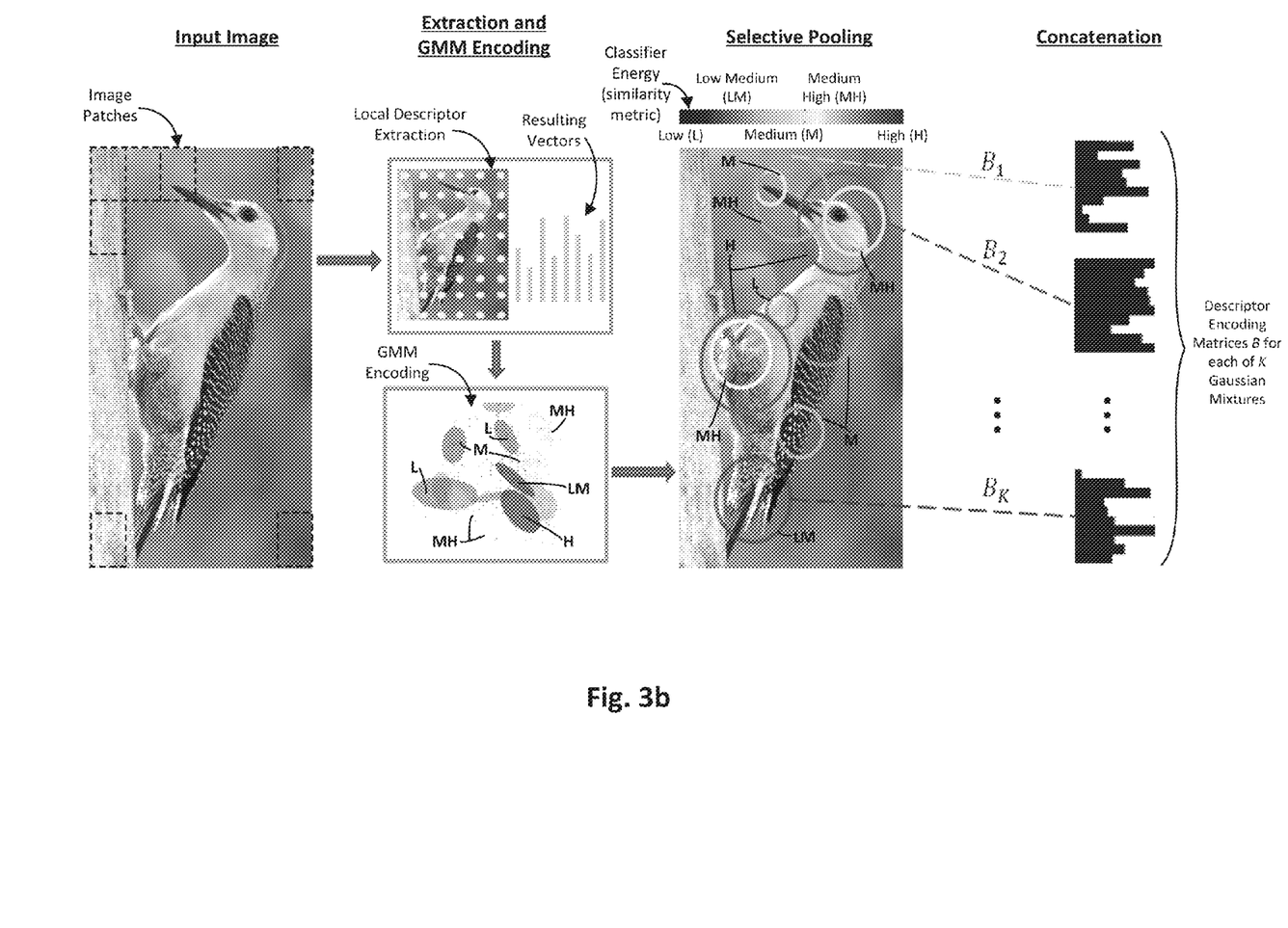
Figure 3C:
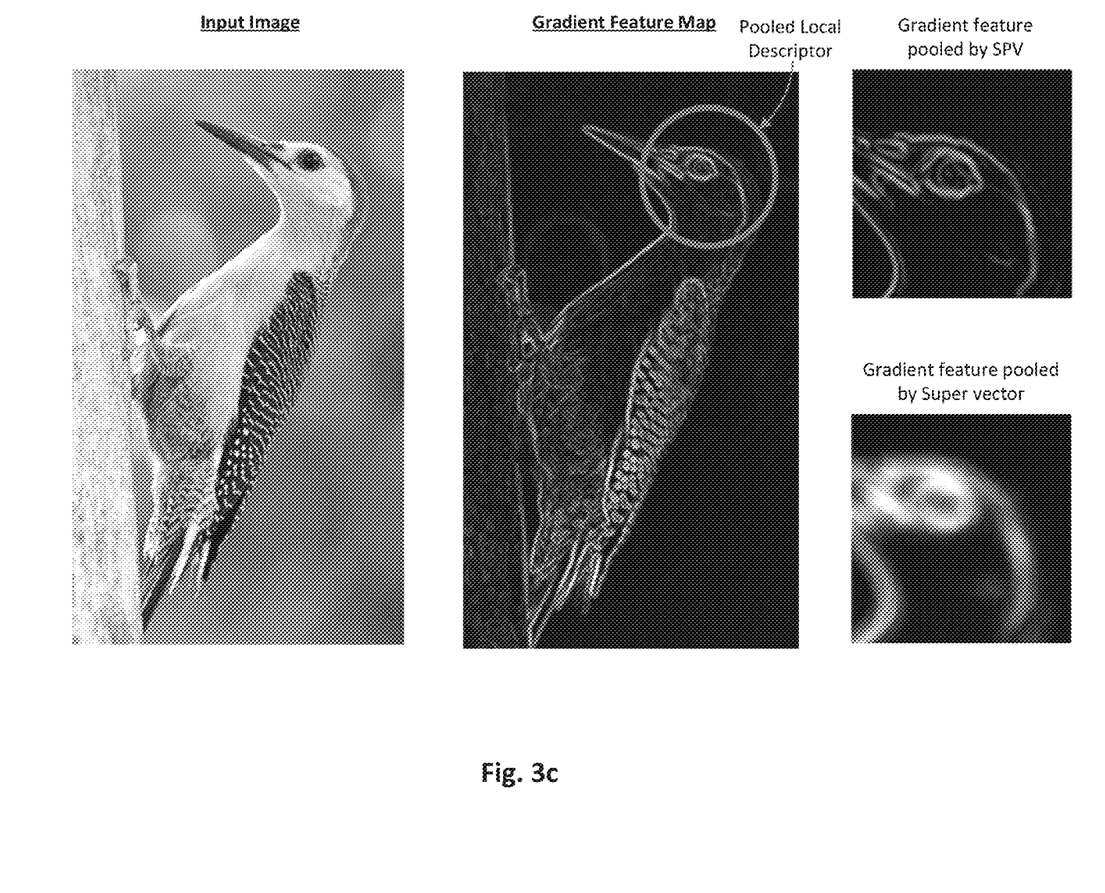
FIG. 3c illustrates a comparison of image feature representations generated by an image feature builder configured in accordance with an embodiment of the present invention and a conventional image building process.

Before discussing the selective pooling vector (SPV) methodology with reference to FIGS. 3*a-c,* it may be helpful to first understand the rationale behind the methodology as a way to generate a new image feature representation. In general, a nonlinear function in original space can be learned as a linear function in its high-dimensional embedded space. To ensure a desired degree of accurate function learning, a selective pooling procedure as provided herein is used to select the most significant local descriptors, from which a new image feature representation can be derived.

For image recognition, each image is represented as a bag of local descriptors I={$z_1, z_2, \ldots, z_n$} where $z_i$ is the i-th local descriptor (e.g., scale invariant feature transform or so-called SIFT or local binary pattern or so-called LBP). For purposes of discussion and simplicity, the two-class problem c={−1, +1} is used. Assuming that these local descriptors are i.i.d., look at the log odds ratio for classification, $$\log\frac{p(I\mid c=+1)}{p(I\mid c=-1)}=\qquad\text{(Equation 1)}$$

$$\log\frac{\prod_{i=1}^{n} p(z_i\mid c=+1)}{\prod_{i=1}^{n} p(z_i\mid c=-1)}=\log\frac{\exp\left(\sum_{i=1}^{n} g(z_i,c=+1)\right)}{\exp\left(\sum_{i=1}^{n} g(z_i,c=-1)\right)}$$

$$\sum_{i=1}^{n}\{g(z_i,c=+1)-g(z_i,c=-1)\}$$

where $g(z_i, c)$ is the potential function that determines the likelihood of $z_i$ belonging to class c. Let $f(z_i)=g(z_i, c=+1)-g(z_i, c=-1)=g(z_i, c=+1)$, and equation 1 translates into $$\log\frac{p(I\mid c=+1)}{p(I\mid c=-1)}=\sum_{i=1}^{n}\{f(z_i)\}.\qquad\text{(Equation 2)}$$

Therefore, if it is known that function $f$ in the local image descriptor space, then image I can be classified as c=+1 if $\sum_{i=1}^{n} f(z_i) > 0$ and c=−1 otherwise.

Nonlinear Function Learning To learn function $f$, we would like to find a nonlinear mapping $\phi(z)$ such that $f(z)$ can be well approximated by a linear function, i.e., $f(z) \approx w^t\phi(z)$. Let $D \subset \mathbb{R}^p = \{d_1, d_2, \ldots, d_K\}$ denote a set of anchor points in the local descriptor space, which is referred to as a codebook. For a data sample z, denote $d_*(z) \in D$ as its closest anchor point or codebook item. Suppose function $f$ is sufficiently smooth, specifically, that $f(z)$ is β-Lipschitz smooth if for all z, z' $\in \mathbb{R}^p$, $$|f(z)-f(z')-\nabla f(z')^T(z-z')|\le\frac{\beta}{2}\|z-z'\|^2.\qquad\text{(Equation 3)}$$

Then we have $$|f(z)-f(d_*(z))-\nabla f(d_*(z))^T(z-d_*(z))|\le\frac{\beta}{2}\|z-d_*(z)\|^2.\qquad\text{(Equation 4)}$$

This bound states that $f(z)$ can be well approximated by $f(d^*(z))+\nabla f(d^*(z))^T(z-d^*(z))$ if z is sufficiently close to $d^*(z)$. It also implies that $f(z)$ can be approximated by a linear function, $$f(z)\approx\sum_{k=1}^{K} w_k^T\phi_k(z)\qquad\text{(Equation 5)}$$

where $$\phi_k(z)=r_k(z)[1,(z-d_k)]^T,\qquad\text{(Equation 6)}$$

$$w_k=[f(d_k),\nabla f(d_k)^T]^T,\qquad\text{(Equation 7)}$$

where $r_k(z)$ is the vector quantization encoding coefficients for z with respect to codebook D defined as $$r_k(z)=\begin{cases}1,&\text{if } k=\mathrm{argmin}_{j\in\{1,\ldots,K\}}\|z-d_j\|^2,\\ 0,&\text{otherwise}\end{cases}.\qquad\text{(Equation 8)}$$

The concatenation of $\phi_k$ and $w_k$ with $\phi$ and w is denoted as follows:

$$\phi(z)=[\phi_k(z)]_{k\in\{1,\ldots,K\}}\qquad\text{(Equation 9)}$$

$$w=[w_k]_{k\in\{1,\ldots,K\}}.\qquad\text{(Equation 10)}$$

Then the classification decision function in Eqn. (2) can be expressed as $$\sum_{i=1}^{n} f(z_i)=w^T\sum_{i=1}^{n}\phi(z_i).\qquad\text{(Equation 11)}$$

Given the codebook D, it is relatively easy to compute $\sum_{i=1}^{n}\phi(z_i)$, which is denoted as $\psi(I)$. However, the function values on the anchor points in D, i.e., w, are still unknown. Note that if $\psi(I)$ is regarded as the target image feature, w is basically the linear classifier, which can be learned from labeled training data.

FIGS. 3a-b collectively illustrate a method for carrying out image classification in accordance with an embodiment of the present invention. As can be seen, the methodology can be carried out by the image feature builder 101 discussed with reference to FIG. 2, and the flow chart of FIG. 3a is annotated with the modules/components that can carry out each part of the flow, in one example embodiment. However, other embodiments may carry out the methodology using different structures but still provide overall similar functionality, as will be appreciated in light of this disclosure.

The method includes densely extracting 305 local descriptors from a given input image, and then encoding 307 the local descriptors using a Gaussian Mixture Model (GMM). For each Gaussian mixture, the method continues with conducting 309 selective pooling to identify most representative local descriptors, and then concatenating 311 the selectively pooled vectors from all the mixtures to form the final image feature representation. The method of this example embodiment further continues with providing 313 the final image feature representation to a classifier.

This selective pooling vector methodology or framework is further demonstrated in the specific example of FIG. 3b. As can be seen, an input image of a bird is provided, which can be divided into a plurality of image patches. Note the size of the image patches is relatively large for purposes of illustration. Actual image patch sizes will vary from one embodiment to the next, and may be in the pixel range (e.g., x by y pixel patches) and be any suitable shape (e.g., square, rectangular or any other shape that can capture all or at least substantial portions of the target image). Further note that while the image patches are shown as non-overlapping, they may overlap with one another as well, as will be appreciated. In any case, each image patch is converted to a local descriptor or vector, as shown in the extraction portion of FIG. 3b. Then, each image patch vector is compared to the Gaussian mixture components of the GMM (recall that each mixture component is also a vector). Each comparison generates a similarity score for each image patch vector. In some respects, the similarity score can be thought of as a measure of the classifier energy associated with the image patch. Specifically, the more similar an image patch vector is to one of the Gaussian mixture component vectors, the greater the chance that the classifier will classify the image patch correctly. Hence, greater similarity between the vectors, the greater the classifier energy. Said differently, the closer the vectors are to one another (mathematically speaking), the greater the classifier energy. This energy or similarity metric is depicted in FIG. 3b as generally ranging from low (L), to low medium (LM), to medium (M), to medium high (MH), to high (H), as shown in the GMM encoding portion of FIG. 3b. For each Gaussian mixture component, the image patch vectors associated with a similarity score that is too low or otherwise below a given threshold can be eliminated, as further shown in the selective pooling portion of FIG. 3b. For instance, assume that any image patch vectors associated with energy below medium are discarded. The remaining selectively pooled vectors from all the Gaussian mixture components are then concatenated or otherwise used to form the final image feature vector, as shown in the concatenation portion of FIG. 3b. As previously explained, normalization within each Gaussian mixture can be used to evenly spread the feature energy. The resulting final image feature vector (encoding matrices $B_1$, $B_2, \ldots, B_K$) can be embedded with the image (e.g., tagged or otherwise associated with the image) and provided to a classifier to be categorized.

As will be appreciated in light of this disclosure, the methodology may also be depicted or otherwise expressed in mathematical terms. In more detail, according to Equation 4, the linear approximation accuracy of function $f$ is bounded by the quantization error $\|z - d^*(z)\|_2^2$. Therefore, the function approximation accuracy can be improved by learning the codebook D to minimize the quantization error. One way to learn such a codebook is by the K-means algorithm:

$$D = \operatorname{argmin}_D \left\{ \sum_Z \min_{d \in D} \|z - d\|^2 \right\}. \quad \text{(Equation 12)}$$

However, as the dimension of the local descriptor space is usually high, e.g., SIFT has 128 dimensions and LBP has 59 dimensions, a limited number of anchor points are not sufficient to model the entire space well. As a result, there will be always local descriptors that have large quantization errors with respect to the codebook D. As will be appreciated in light of this disclosure, including local descriptors that are too far away from the set of anchor points D in Equation 2 will result in a poor learning of w. Therefore, rather than using all local descriptors in the image, $\psi(1)$ can be computed by only choosing local descriptors that are sufficiently close to the codebook D. Specifically, and in accordance with one example embodiment, for each local descriptor $z_i$, its distance from its closet anchor point $\|z_i - d^*(z_i)\|_2^2$ is measured and that local descriptor $z_i$ is selected only when the quantization error is smaller than a predefined threshold $\in$.

So, a descriptor encoding matrix $A \in \mathbb{R}^{K \times n}$ is defined, where K is the number of anchor points and n is the number of local descriptors in the input image, for all local descriptors by $$A(k, i) = \begin{cases} 1, & k = \operatorname{argmin}_{j \in \{1, \ldots, K\}} \|z_i - d_j\|^2 \\ 0, & \text{otherwise} \end{cases} \quad \text{(Equation 13)}$$

and $\|z_i - d_k(z_i)\|_2^2 \le \in$.

Then we encode each local descriptor as $$\phi(z_i) = [A(k, i), A(k, i)(z_i - d_k)^T]_{k \in \{1, \ldots, K\}}^T, \quad \text{(Equation 14)}$$

and the image feature representation is again computed as $\psi(1) = \Sigma \phi(z_i)$. As each encoded local feature has a dimension of $K \times (p+1)$, where K is the number of anchor points and p is the dimension of the local descriptor, a high final image feature dimension of $K \times (p+1)$ is provided. Note that matrix A is a binary matrix that encodes which descriptors are selected with respect to each anchor point. Specifically, not all local descriptors are used to construct the final image feature.

Refined Selective Pooling Vector

As will be appreciated in light of this disclosure, image feature representation is refined by incorporating the properties of GMM. In more detail, from the training images, a subset of the local descriptors is first sampled to train a Gaussian Mixture Model (GMM) with the standard expectation-maximization (EM) algorithm. Here the learned GMM can be denoted as $\Sigma_{i=1}^{K} \upsilon_k \mathcal{N}(\mu_k, \Sigma_k)$. Rather than using binary assignment for selective pooling, the encoding matrix A can be defined by the posterior probabilities of the local descriptors belonging to each Gaussian mixture:

$$A(k, i) = \frac{\upsilon_k \mathcal{N}(z_i; \mu_k, \Sigma_k)}{\Sigma_{j=1}^{K} \upsilon_j \mathcal{N}(z_i; \mu_j, \Sigma_j)} \quad \text{(Equation 15)}$$

Each row of matrix A indicates which descriptors are softly selected for the corresponding mixture or anchor point, while each column represents the soft vector quantization encoding coefficients of a local descriptor with respect to all Gaussian mixtures. With the newly defined encoding matrix A, different procedures of selective pooling can be defined, including radius pooling, posterior thresholding, k-nearest neighbor pooling, and max pooling. Each of these procedures will now be discussed in turn. Note that these pooling procedures are different from traditional pooling. In particular, not only are the encoding coefficients pooled, but also their corresponding local descriptors are pooled.

Radius pooling: Set the elements of A to be zero if the Mahalanobis distance between descriptors and GMM centers exceed a certain threshold $\tau$:

$$B(k, j) = \begin{cases} A(k, j), & (z_i - \mu_k)^T \Sigma_k^{-1} (z_i - \mu_k) < \tau \\ 0, & \text{otherwise} \end{cases} \quad \text{(Equation 16)}$$

Posterior thresholding: Instead of inspecting the Mahalanobis distances directly, a suitable approximation would be to set the elements of A to be zero if they are smaller than some threshold $\sigma$:

$$B(k, j) = \begin{cases} A(k, j), & A(k, j) > \sigma, \\ 0, & \text{otherwise} \end{cases} \quad \text{(Equation 17)}$$

k-nearest neighbor pooling: A problem of radius pooling with a fixed threshold is that it does not adapt to the local density of the feature space very well, and thus is typically inferior to the k-nearest neighbor method. Therefore, as an approximation, k-nearest neighbor pooling is used by retaining the largest k values of each row of encoding matrix A and set the rest to be zero.

Max pooling: In the extreme case, 1-nearest neighbor pooling is used by keeping only the largest value in each row of encoding matrix A and setting all others to be zero, which is referred to herein as max pooling.

$$B(k, j) = \begin{cases} A(k, j), A(k, j) > A(k, i) \forall\ i \neq j, \\ 0, \text{otherwise} \end{cases} \quad \text{(Equation 18)}$$

As will be seen in the experiment section, max pooling works very well in general for the selective pooling vector (SPV) methodology provided herein.

Based on Equation 14, each local descriptor z can be encoded using the new encoding matrix B:

$$\phi(z_i) = [B(k, i), B(k, i)(z_i - \mu_k)^T]_{k \in \{1, \ldots, K\}}^T. \quad \text{(Equation 19)}$$

In some embodiments, the selective pooling vector methodology may further include normalizing the feature representation properly in order to facilitate the classifier learning. Specifically, the local descriptor embedding may be modified by incorporating Gaussian covariance normalization and feature cardinality normalization as below:

$$\phi(z_i) = [\tilde{B}(k, i), \tilde{B}(k, i), [\Sigma_k^{-\frac{1}{2}}(z_i - \mu_k)^T]_{k \in \{1, \ldots, K\}}^T, \quad \text{(Equation 20)}$$

where $\tilde{B}(k, i) = B(k, i) \| B(k,:) \| \mu_1$ with $\| B(k,:) \| \mu_1$ being the sum of the k-throw of B. Note that the covariance normalization corresponds to feature whitening within each Gaussian mixture to evenly spread the feature energy, which has been shown to be effective for training linear classifiers.

In contrast to the selective pooling vector feature methodology provided herein, and as previously explained, prior work such as Super vector coding, Fisher vector, and vector of locally aggregated descriptors (VLAD) all utilize all available local descriptors from the input image to construct their image features. Using all local descriptors for weighted averaging can suppress the intra-class variance of the local descriptors, which is acceptable for coarse-grained image classification. However, as previously explained, for fine-grained image classification, which is more sensitive to quantization errors of the local descriptors, keeping the intra-class variance is important to distinguish different subcategories. Averaging pooling in Super vector and Fisher vector tends to smear the local object parts that are important for the recognition. Although the GMM itself is doing a certain degree of selective pooling by assigning lower weights to descriptors far away from mixture centers, the fact that GMM is a generative model for the entire space makes the exponential weight decay not fast enough for selective pooling. Therefore, some amount of averaging effect still exists in Super vector or Fisher vector based procedures.

FIG. 3c illustrates a comparison of image feature representations generated by an image feature builder configured to execute selective pooling in accordance with an embodiment of the present invention and a conventional image building process based on the Super vector process. As can be seen, for a given input image of a bird, FIG. 3c visualizes the feature differences between the selective pooling vector (SPV) and the Super vector procedures using the gradient map feature. Since it is difficult to visualize SIFT descriptors easily, the gradient map is used as an approximation of SIFT for illustration purposes. The circled area of the gradient feature map in the middle of FIG. 3c gives the most confident local descriptor for a particular Gaussian component. The top right gradient feature map shows the local descriptor pooled by the SPV methodology provided herein in accordance with an embodiment, while the bottom right gradient feature map shows the descriptor pooled by the Super vector methodology. As can be seen, Super vector coding blurs the fine local details that could be important for fine-grained image recognition and classification, even though its feature construction is based on weighted average.

It is also worth to note that sparsification is a common practice used in Fisher vector to speed up computation. It is typically done by setting A(k, i) to zero for very small values. However, the motivation of their sparsification is mainly for speed concern, which is very different from the selective pooling provided herein. In particular, the selective pooling is much more aggressive so as to actually discard at least some local descriptors to ensure accurate function learning for fine-grained recognition tasks, and in an extreme case, all local descriptor are discarded except for a single local descriptor that is selected for each Gaussian mixture. In still other such cases, no local descriptors are selected for at least one of the given Gaussian mixtures.

The extreme case of selective pooling vector using max pooling (with no feature averaging) in accordance with an embodiment of the present disclosure is particularly interesting. As we will show in the experiment section, SPV with max pooling will usually give the best performance.

To incorporate the discriminative spatial information for image recognition, a process similar to spatial pyramid matching can be applied where each image is partitioned into different size of blocks (e.g., 1×1, 4×1) at different spatial scales. Alternatively, we could follow the rough part alignment framework to segment the object and divide it into different sub-regions. Then, the methodology provided herein can be used to extract selective pooling vector(s) from each of the spatial blocks or sub-regions. The final image feature representation is obtained by concatenating all selective pooling vectors.

Experimental Results

In this section, the selective pooling vector (SPV) methodology provided herein is applied to fine-grained recognition tasks including face recognition and fine-grained object recognition. Extensive experiments have been carried on several standard benchmark datasets. It is shown that the SPV methodology outperforms both super vector and Fisher vector representations on these fine-grained problems, and favorable comparisons with state-of-the-art fine-grained recognition methods demonstrate the effectiveness of the new image feature. In the experiments, it was found that k-nearest neighbor pooling typically works better than radius pooling or posterior thresholding, where the latter are more sensitive to parameter tuning. Therefore, in the following experiments, only results on SPV with k-nearest neighbor pooling are reported.

Face Recognition

The standard CMU Multi-PIE face dataset is used as the benchmark to compare the SPV methodology with conventional methods. The database contains 337 subjects with a spectrum of variations caused by different poses, expressions, and illumination conditions. The dataset is challenging due to the large number of subjects, and the big heterogeneous appearance variations. The evaluations were executed with standard experimental settings. Among the 337 subjects, 249 subjects in Session 1 are used for training. Session 2, 3 and 4 are used for testing. For each subject in the training set, seven frontal face images with neutral expression taken under extremal illumination conditions are included. For the testing set, all images taken under twenty illumination conditions are used. The recognition accuracy is reported for each session respectively. For all of the experiments on CMU-PIE dataset, the image was resized to 80. SIFT descriptors and LBP descriptors were then densely extracted over a grid of 3 pixels at different scales (8×8, 12×12, 16×16, 24×24, 32×32). The feature dimension was reduced to 80 through PCA. A GMM with 512 components was learned and a three-level spatial pyramid(1×1, 2×2, 3×1) is built to incorporate the spatial information. Finally a linear support vector machine (SVM) classifier is learned for classification.

The effect of k in k-nearest neighbor selective pooling is first evaluated. One extreme case is to keep only the largest value for each row of the encoding matrix A, which basically is max pooling. The max pooling approach can be interpreted as finding the most confident local descriptor for each GMM component for the final classification. The other extreme case is to keep all the values, and then compute a weighted local descriptor for each GMM component. In this case, the proposed pooling feature degenerates to Super vector, which bears large similarity to the Fisher vector. The value of k is varied and the corresponding performance changes are reported, as shown in Table 1.

TABLE 1

The recognition accuracy of SPV on CMU Multi-PIE.

| k-nearest neighbor pooling | Session 2 | Session 3 | Session 4 |
| --- | --- | --- | --- |
| k = 1 | 96.3% | 96.2% | 96.7% |
| k = 2 | 95.9% | 96.3% | 96.6% |
| k = 3 | 96.0% | 96.1% | 96.4% |
| k = 5 | 94.6% | 94.9% | 94.7% |
| k = 10 | 93.7% | 93.6% | 93.8% |
| k = 100 | 92.0% | 92.5% | 92.7% |
| k = 1578 | 92.0% | 92.4% | 92.7% |

As can be seen, it was found that keeping a small number of local descriptors for each component gives superior results: For k=1, the recognition accuracies are already quite high for all three sessions: 96.3%, 96.2%, 96.7%. For k=2 and k=3, the performance is similar. However, the performance tends to drop as k gets larger. If all the local descriptors are kept (k=1578), which corresponds to the super vector, the performance drops significantly to 92.0%, 92.4%, 92.7% on the three sessions, respectively. This performance change can be well explained as follows: local descriptors with low posterior probabilities have large quantization errors that are destructive to learning the classification function. Although tuning the number of neighbors k for pooling might increase the performance (e.g., performance gain on Session 3), max pooling is used from now on for its simplicity, efficiency, as well as effectiveness. However, as will be appreciated, the present disclosure is not intended to be limited to embodiments utilizing max pooling.

The SPV local feature embedding methodology reported in Table 1 is now compared with several state-of-the-art face recognition methods, including face recognition algorithm using sparse representation, supervised parse coding, and the recent structure sparse coding. The face recognition comparisons are shown in Table 2.

TABLE 2

Comparisons with state-of-the-art on CMU Multi-PIE for face recognition.

| Algorithms | Session 2 | Session 3 | Session 4 |
| --- | --- | --- | --- |
| Sparse Representation | 91.4% | 90.3% | 90.2% |
| Unsupervised Codebook | 94.6% | 91.0% | 92.5% |
| Supervised Codebook | 95.2% | 93.4% | 95.1% |
| Structured Sparsity | 95.7% | 94.9% | 93.7% |
| SPV (k = 1; max pooling) | 96.3% | 96.2% | 96.7% |

As can be seen, the SPV methodology, with k=1 (effectively max pooling) achieved 96.3%, 96.2%, 96.7%, the highest recognition rates on all three sessions, outperforming all state-of-the-art methods.

Fine-Grained Recognition

The effectiveness of the selective pooling vector methodology provided herein was further evaluated by comparing its performance with various state-of-the art fine-grain image recognition methods on two challenging benchmark fine-grained datasets: Caltech-UCSD Birds 2010 and Stanford Dogs dataset.

The Caltech-UCSD Birds 2010 dataset contains 6,044 images from 200 bird species; some of the species have very subtle inter-class differences. The standard training/testing split was adopted on the Bird dataset, i.e., around 15 training and 15 test images per category. The Stanford Dogs dataset is another popular benchmark dataset containing 20,580 images of 120 breeds of dogs. For the experiments on these two datasets, the standard evaluation protocol was followed: the training dataset was augmented by mirroring the training images so that the training set is doubled. The labeled bounding boxes are used to normalize the images. The performance is evaluated according to the category normalized mean accuracy. For experiments on these two datasets, SIFT descriptors from the opponent color space and LBP descriptors were densely extracted over a grid of 3 pixels at five scales (16×16, 24×24, 32×32, 40×40, 48×48). The dimension of the local descriptors is then reduced by PCA and the GMM component number K is set to be 1024. Finally the selective pooling vector representation as provided herein is fed to a linear SVM classifier.

Fine-grained object recognition results are reported with two different spatial information encoding methods. The first one is the traditional spatial pyramid matching algorithm with three layers (1×1, 2×2, 4×1). The second one is the spatial encoding algorithm introduced by Gavves et al. and is as follows. First, GrabCut is used on the labeled bounding box to compute an accurate foreground segmentation. Second, the mean and covariance of the pixels on the segmentation mask is computed, and accordingly fit an ellipse to these pixels. Third, the principle axis of the ellipse is divided equally into four segments, and regions are defined that fall into each segment as an object part. Finally for each segment region, the selective pooling vector is generated as provided herein, and the selected pooling vectors are concatenated as the final object representation.

For the fine-grained recognition experiment on Bird dataset, the selective pooling vector (SPV) method was compared with state-of-the-art feature coding and learning algorithms, including locality-constrained linear coding (LLC), multi-kernel learning, and the Fisher vector method under the same settings, i.e., same local descriptors and same number of Gaussian mixtures. To encode the spatial information, we first use the traditional 3-layer spatial pyramid for all algorithms. The comparison results are shown in Table 3.

TABLE 3

Comparison with feature learning algorithms on Caltech-UCSD Bird Dataset.

| Algorithms | Accuracy |
| --- | --- |
| LLC | 18.0% |
| Multiple Kernel Learning | 19.0% |
| Fisher Vector | 41.1% |
| SPV (k = 1; max pooling) | 46.7% |

As can be seen, a much higher accuracy than LLC was achieved with the SPV methodology on the Bird dataset: a significant performance leap from 18% to 46.7%. Comparing with state-of-the-art object recognition Fisher vector algorithm, the SPV method still works much better, outperforming the Fisher vector method by about 5%. Since locality-constrained linear coding (LLC) only uses the pooling coefficients for classification, these pooling coefficients are too coarse to distinguish the subtle inter-class differences in fine-grained recognition tasks. The Fisher vector algorithm and the SPV methodology both preserve the local descriptor information, which helps to differentiate the subtle differences between fine-grained object categories. However, as previously explained, Fisher vector uses all local descriptors to construct the feature representation (i.e., average pooling), while the SPV methodology provided herein discards local descriptors that are far away from the Gaussian mixture centers and makes use of only the more confident local descriptors for classification. Therefore, the function learning in the new feature can be more accurate and as a result can achieve better performance.

Comparisons between the SPV methodology and many state-of-the-art algorithms reported on this bird dataset are shown in Table 4.

TABLE 4

Comparison with state-of-the-arts on Caltech-UCSD Bird Dataset.

| Algorithms | Accuracy |
| --- | --- |
| Co-Segmentation | 23.3% |
| Discriminative Color Descriptors | 26.7% |
| Unsupervised Template Learning | 28.2% |
| Detection + Segmentation | 30.2% |
| DPM + Segmentation + Fisher Vector | 47.3% |
| SPV (Alignment) | 48.9% |

In this case, the segmentation alignment algorithm by Graves as previously described was used to encode the spatial information, which increases performance of the SPV method by 2.2% compared with the SPV method reported in Table 3. As can be seen from Table 4, the SPV method clearly outperforms all state-of-the-arts. The closest in performance to the SPV method was an elegant joint framework of the deformable parts model (DPM) and segmentation algorithm built on Fisher vector. The SPV method improves the accuracy from 47.3% to 48.9%, but with a simpler learning and testing scheme.

Comparing with the Bird dataset, the Stanford Dog dataset contains more images and has even larger shape and pose variations. Again, result comparisons with LLC coding and Fisher vector coding are reported first under the same experimental setup with spatial pyramid, as shown in Table 5.

TABLE 5

Comparison with feature learning algorithms on Stanford Dogs Dataset.

| Algorithms | Accuracy |
| --- | --- |
| LLC | 14.5% |
| Fisher Vector | 41.0% |
| SPV (k = 1; max pooling) | 47.2% |

As can be seen, there is a big performance improvement over LLC from 14.5% to 47.2%. Comparing with Fisher vector under the same experiment settings, the SVP method again performs much better, around 6% higher. The results are consistent with observations on the Bird dataset.

Table 6 reports comparisons between the SVP method and state-of-the-art algorithms on the dog dataset.

TABLE 6

Comparison with state-of-the-arts on Stanford Dogs Dataset.

| Algorithms | Accuracy |
| --- | --- |
| Tricos | 26.9% |
| Discriminative Color Descriptors | 28.1% |
| Unsupervised Template Learning | 38.0% |
| DPM + Segmentation + Fisher Vector | 45.6% |
| Alignment + Fisher Vector | 50.1% |
| SPV (Alignment) | 52.0% |

Again, the spatial alignment algorithm by Gavves et al. was used to encode the spatial information. This time, it increases performance of the SVP method from 47.4% with max pooling to 52.0%, a leap larger than observed on the bird dataset. Due to the larger shape and pose variations in the Stanford Dog dataset, spatial alignment helps more. On this dataset, the unsupervised template learning algorithm achieved a recognition accuracy of 38.0%. The segmentation based frameworks showed great success and achieved 45.6% and 50.1%, respectively. With the spatial alignment algorithm introduced by Gavves et al., an accuracy of 52% was achieved, outperforming the DPM and segmentation algorithm by 6.4%, and the prior best result by 1.9%. Note that the difference between the SPV method provided herein and that of the spatial alignment algorithm introduced by Gavves et al. is the use of selective pooling vector rather than Fisher vector.

The experiment results show superior performance of the SPV method over state-of-the-art algorithms on several fine-grained recognition tasks. One interesting observation is that the SPV method can bring more improvements over Super vector when objects are not very well aligned (e.g., in the case of using spatial pyramid in Tables 3 and 5), indicating that selective pooling as provided herein is more robust than the average pooling used in Super vector and Fisher vector on fine-grained recognition tasks.

Example Computing System

Figure 4:
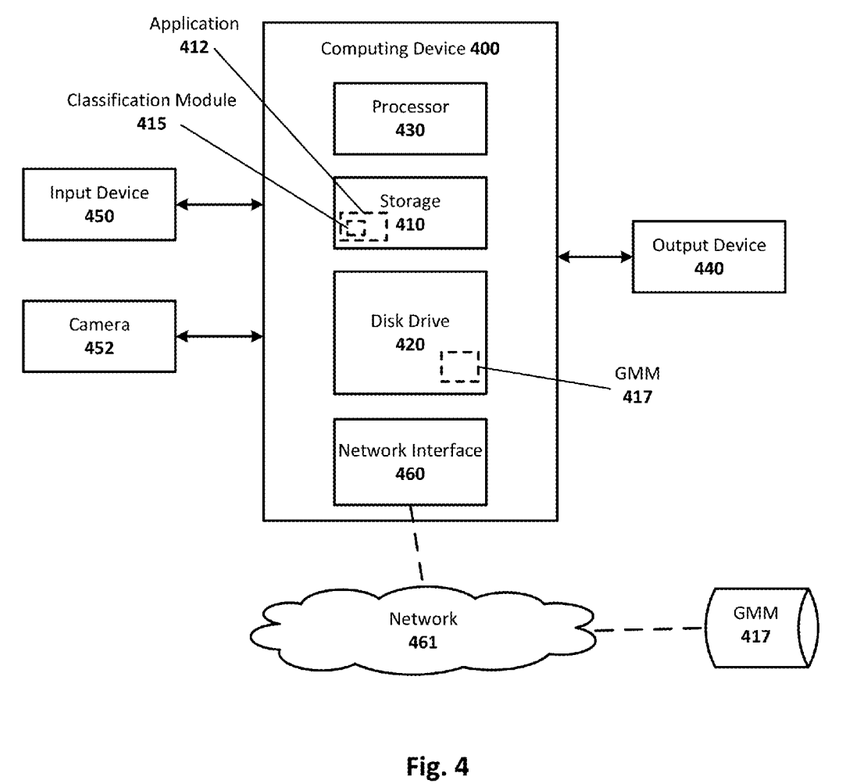
FIG. 4 illustrates an example computing system that includes an image classification software application configured in accordance with an embodiment of the present invention.

FIG. 4 illustrates an example computing system configured in accordance with an embodiment of the present invention. As can be seen, the computing device 400 also includes at least one processor 430 for executing computer-readable and computer-executable instructions or software stored in the storage device 410 and disk drive 420 and other programs for controlling system hardware. In this example case, application 412 is stored in storage 410 and includes a classification module 415, for classifying images as provided herein. As can be further seen, a GMM 417 may be provided on disk drive 420, but may also be accessible to the system 400 via a network interface 460 and a given network 461, which may include, for example, a local area network (e.g., Wi-Fi network) and the Internet, although any suitable communication network can be used. Virtualization may be employed in the computing device 400 so that infrastructure and resources in the computing device 400 may be shared dynamically. For example, a virtual machine may be provided to handle a process running on multiple processors 430 so that the process appears to be using only one computing resource rather than multiple computing resources. Multiple virtual machines may also be used with one processor.

A user may interact with the computing device 400 through an output device 440, such as a touch-sensitive display screen or monitor, which may display content and one or more user interfaces, in accordance with an embodiment. In other embodiments, the output device 440 may be a non-touch display, such as a CRT display, LED, or flat panel display. The computing device 400 may also include other input devices 450 for receiving input from a user such as, for example, a keyboard, a joystick, a game controller, a pointing device (e.g., a mouse, a user's finger interfacing directly with a trackpad, etc.), or any suitable user interface. The computing device 400 may include other suitable conventional I/O peripherals, such as a camera 452 that can generate images that can then be classified using the techniques provided herein, in accordance with an embodiment. Any number of input/output schemes that allow a user to interact with the system 400 can be used.

The computing device 400 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 400 and performing the operations described in this disclosure. In an embodiment, the operating system may be run on one or more cloud machine instances.

As previously explained, the functional components/modules used to carryout selective vector pooling as provided herein may be implemented with software (as part of application 412, or otherwise executable by a call from application 412 or the operating system of device 400), hardware such as gate level logic (e.g., FPGA) or a purpose-built semiconductor (e.g., ASIC), or firmware (e.g., embedded routines of a microcontroller). In a more general sense, any suitable combination of hardware, software, and firmware can be used, as will be apparent. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 400, can be integrated into, for example, one or more desktop or laptop computers, workstations, tablets, smart phones, game consoles, set-top boxes, or other such computing devices. Other componentry and modules typical of a typical computing system, such as display drivers, graphics processor, and operating system, are not shown but will be readily apparent in light of this disclosure.

Example Embodiments

Numerous embodiments will be apparent, and features described herein can be combined in any number of configurations. One example embodiment of the present invention provides a computer-implemented method. The method includes a receiving a digital image, and dividing the image into image patches. The method continues with generating a vector for each image patch, and comparing each image patch vector to Gaussian mixture components of a Gaussian Mixture Model (GMM), each mixture component being a vector, thereby generating a similarity score for each image patch vector. Thus, the similarity score can be found, for example, by computing the posterior probability of the image patch representation belonging to a Gaussian mixture component (see Equation 15, for example). For each Gaussian mixture component, the method continues with eliminating one or more image patch vectors associated with a similarity score that is below a given threshold. The method further includes generating a final image feature vector from the remaining image patch vectors of all the Gaussian mixture components. In some cases, the method further includes providing the final image feature vector to a classifier so the given input image can be categorized. In some cases, for each Gaussian mixture component, a plurality of image patch vectors remain, so as to provide k-nearest neighbor pooling or thresholding. In some cases, for each Gaussian mixture component, one image patch vector remains, so as to provide 1-nearest neighbor pooling. In some cases, for one or more Gaussian mixture components, no image patch vectors remain. In some cases, the remaining vectors are represented as matrices, and generating the final image feature vector includes combining those matrices via concatenation. In some cases, an encoding matrix is used to combine select image patch vectors to produce the final image feature vector, and eliminating the one or more image patch vectors includes keeping only the largest value in each row of the encoding matrix and setting all others to be zero.

Another embodiment of the present invention provides a non-transient computer program product having instructions encoded thereon that when executed by one or more processors causes a process to be carried out. The process includes dividing a digital image into image patches, and generating a mathematical representation for each image patch. The mathematical representation may be a vector or some other suitable representation. The process further includes comparing each image patch mathematical representation to Gaussian mixture components of a Gaussian Mixture Model (GMM), thereby generating a similarity score for each image patch mathematical representation. As previously explained, this comparing may comprise finding the similarity score by computing the posterior probability of the image patch representation belonging to a Gaussian mixture component. For each Gaussian mixture component, the process includes eliminating one or more image patch mathematical representations associated with a similarity score that is below a given threshold. The process further includes generating a final image feature mathematical representation from the remaining image patch mathematical representations of all the Gaussian mixture components. In some cases, the process further includes categorizing the input image using the final image feature mathematical representation. In some cases, for each Gaussian mixture component, a plurality of image patch mathematical representations remain, so as to provide k-nearest neighbor pooling or thresholding. In some cases, for each Gaussian mixture component, one image patch mathematical representation remains, so as to provide 1-nearest neighbor pooling. In some cases, for one or more Gaussian mixture components, no image patch mathematical representations remain. In some cases, the remaining mathematical representations are represented as matrices, and generating the final image feature mathematical representation includes combining those matrices via concatenation. In some cases, an encoding matrix is used to combine select image patch vectors to produce the final image feature vector, and eliminating the one or more image patch mathematical representations includes keeping only the largest value in each row of the encoding matrix and setting all others to be zero.

Another embodiment of the present invention provides a computing system. The system includes an electronic memory for storing executable instructions, and a processor configured to execute the instructions to: divide a digital image into image patches; generate a vector for each image patch; compare each image patch vector to Gaussian mixture components of a Gaussian Mixture Model (GMM), each mixture component being a vector, thereby generating a similarity score for each image patch vector; for each Gaussian mixture component, eliminate one or more image patch vectors associated with a similarity score that is below a given threshold; generate a final image feature vector from the remaining image patch vectors of all the Gaussian mixture components; and categorize the image using the final image feature vector. In some cases, for each Gaussian mixture component, a plurality of image patch vectors remain, so as to provide k-nearest neighbor pooling or thresholding. In some cases, for each Gaussian mixture component, one image patch vector remains, so as to provide 1-nearest neighbor pooling. In some cases, for one or more Gaussian mixture components, no image patch vectors remain. In some cases, the remaining vectors are represented as matrices, and processor generates the final image feature vector by combining those matrices via concatenation. In some cases, an encoding matrix is used to combine select image patch vectors to produce the final image feature vector, and eliminating the one or more image patch vectors includes keeping only the largest value in each row of the encoding matrix and setting all others to be zero.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A computer-implemented method, comprising:
   receiving a digital image including a plurality of image features;
   dividing the digital image into image patches, such that each image patch represents only a portion of the received digital image;
   generating an image patch vector for each image patch;
   comparing each image patch vector to Gaussian mixture components of a Gaussian Mixture Model (GMM), each Gaussian mixture component being a vector, thereby generating a similarity score for each image patch vector;
   for each Gaussian mixture component, eliminating one or more image patch vectors associated with a similarity score that is below a given threshold;
   concatenating a plurality of remaining image patch vectors of all the Gaussian mixture components to generate a final image feature vector that represents the plurality of image features in the received digital image; and
   categorizing the digital image using the final image feature vector.

2. The method of claim 1 further comprising providing the final image feature vector to a classifier so the digital image can be categorized.

3. The method of claim 1 wherein, for each Gaussian mixture component, multiple image patch vectors remain, so as to provide k-nearest neighbor pooling.

4. The method of claim 1 wherein, for each Gaussian mixture component, one image patch vector remains, so as to provide 1-nearest neighbor pooling.

5. The method of claim 1 wherein, for one or more Gaussian mixture components, no image patch vectors remain.

6. The method of claim 1 wherein the remaining image patch vectors are represented as matrices, and generating the final image feature vector includes combining those matrices via concatenation.

7. The method of claim 1 wherein an encoding matrix is used to combine select image patch vectors to produce the final image feature vector, and eliminating the one or more image patch vectors includes keeping only a largest value in each row of the encoding matrix and setting all others to be zero.

8. A non-transient computer program product having instructions encoded thereon that when executed by one or more processors causes a process to be carried out, the process comprising:
   dividing a digital image into image patches, each of which represents only a portion of the digital image, wherein the digital image includes a plurality of features;
   generating an image patch vector for each image patch;
   comparing each image patch vector to Gaussian mixture components of a Gaussian Mixture Model (GMM), thereby generating a similarity score for each image patch vector;
   for each Gaussian mixture component, eliminating one or more image patch vectors associated with a similarity score that is below a given threshold; and
   concatenating a plurality of remaining image patch vectors of all the Gaussian mixture components to generate a final image feature vector that represents the plurality of features in the digital image; and
   categorizing the digital image using the final image feature vector.

9. The computer program product of claim 8 wherein, for each Gaussian mixture component, multiple image patch vectors remain, so as to provide posterior thresholding.

10. The computer program product of claim 8 wherein, for each Gaussian mixture component, one image patch vector remains, so as to provide 1-nearest neighbor pooling.

11. The computer program product of claim 8 wherein, for one or more Gaussian mixture components, no image patch vectors remain.

12. The computer program product of claim 8 wherein the remaining image patch vectors are represented as matrices, and generating the final image feature vector includes combining those matrices via concatenation.

13. The computer program product of claim 8 wherein an encoding matrix is used to combine select image patch vectors to produce the final image feature vector, and eliminating the one or more image patch vectors includes keeping only a largest value in each row of the encoding matrix and setting all others to be zero.

14. A computing system, comprising:
an electronic memory for storing executable instructions; and
a processor configured to execute the instructions to:
- divide a digital image into image patches, each of which represents only a portion of the digital image, wherein the digital image includes a plurality of features;
- generate an image patch vector for each image patch;
- compare each image patch vector to Gaussian mixture components of a Gaussian Mixture Model (GMM), each Gaussian mixture component being a vector, thereby generating a similarity score for each image patch vector;
- for each Gaussian mixture component, eliminate one or more image patch vectors associated with a similarity score that is below a given threshold;
- concatenate a plurality of remaining image patch vectors of all the Gaussian mixture components to generate a final image feature vector that represents the plurality of features in the digital image; and
- categorize the digital image using the final image feature vector.

15. The system of claim 14 wherein, for each Gaussian mixture component, multiple image patch vectors remain, so as to provide radius pooling.

16. The system of claim 14 wherein, for each Gaussian mixture component, one image patch vector remains, so as to provide 1-nearest neighbor pooling.

17. The system of claim 14 wherein, for one or more Gaussian mixture components, no image patch vectors remain.

18. The system of claim 14 wherein
the remaining image patch vectors are represented as matrices, and
the processor is further configured to execute the instructions to generate the final image feature vector by combining those matrices via concatenation.

19. The system of claim 14 wherein an encoding matrix is used to combine select image patch vectors to produce the final image feature vector, and eliminating the one or more image patch vectors includes keeping only a largest value in each row of the encoding matrix and setting all others to be zero.

* * * * *

UNITED STATES PATENT AND TRADEMARK OFFICE
CERTIFICATE OF CORRECTION

| | |
|---|---|
| PATENT NO. | : 10,043,101 B2 |
| APPLICATION NO. | : 14/535963 |
| DATED | : August 7, 2018 |
| INVENTOR(S) | : Yang et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 762 days.

Signed and Sealed this
Tenth Day of December, 2019

Andrei Iancu
*Director of the United States Patent and Trademark Office*